United States Patent
Tabor

(10) Patent No.: US 11,917,258 B2
(45) Date of Patent: Feb. 27, 2024

(54) ENHANCED SHIP-BASED NETWORK CONNECTIVITY USING A CONTENT DELIVERY NETWORK (CDN) EDGE SERVER

(71) Applicant: Royal Caribbean Cruises Ltd., Miami, FL (US)

(72) Inventor: Paul Tabor, Miami, FL (US)

(73) Assignee: Royal Caribbean Cruises Ltd., Miami, FL (US)

( * ) Notice: Subject to any disclaimer, the term of this patent is extended or adjusted under 35 U.S.C. 154(b) by 336 days.

(21) Appl. No.: 17/447,915

(22) Filed: Sep. 16, 2021

(65) Prior Publication Data

US 2023/0078360 A1    Mar. 16, 2023

(51) Int. Cl.

| | |
|---|---|
| *H04N 21/61* | (2011.01) |
| *H04B 7/185* | (2006.01) |
| *H04N 21/2183* | (2011.01) |
| *H04N 21/442* | (2011.01) |
| *H04N 21/466* | (2011.01) |
| *H04N 21/472* | (2011.01) |
| *H04N 21/81* | (2011.01) |

(52) U.S. Cl.
CPC ..... *H04N 21/6143* (2013.01); *H04B 7/18513* (2013.01); *H04B 7/18528* (2013.01); *H04B 7/18532* (2013.01); *H04B 7/18563* (2013.01); *H04N 21/2183* (2013.01); *H04N 21/44224* (2020.08); *H04N 21/4667* (2013.01); *H04N 21/472* (2013.01); *H04N 21/8173* (2013.01)

(58) Field of Classification Search
None
See application file for complete search history.

(56) References Cited

U.S. PATENT DOCUMENTS

| | | | |
|---|---|---|---|
| 8,495,679 B2* | 7/2013 | Labeeb | H04N 21/26283 |
| | | | 725/40 |
| 8,799,220 B2* | 8/2014 | O'Malley | G06Q 20/203 |
| | | | 707/694 |
| 9,277,198 B2* | 3/2016 | Fay | G11B 27/34 |
| 2003/0046338 A1* | 3/2003 | Runkis | H04L 67/51 |
| | | | 709/203 |
| 2007/0161382 A1* | 7/2007 | Melinger | H04L 67/52 |
| | | | 709/217 |
| 2023/0023409 A1* | 1/2023 | Thomas | G06Q 30/0635 |

* cited by examiner

*Primary Examiner* — Pablo N Tran
(74) *Attorney, Agent, or Firm* — Knobbe Martens Olson & Bear LLP

(57) ABSTRACT

Systems and methods are provided for enhanced ship-based network connectivity using a content delivery network (CDN) edge server. An example method includes receiving user requests from user devices in wireless communication with a system, with the user requests being associated with applications executing on the user devices. An operating status associated with a satellite communication system is determined, the operation status being indicative of the satellite communication system having bandwidth and/or connectivity to route the user requests via a satellite network. Based on the operating status being negative, a first subset of the user requests is queued for transmission. A second subset of the user requests are responded to using an edge cache. Based on the operating status being positive, the user requests are transmitted via the satellite network to a shore-based system, the shore-based system routing the user requests to web applications associated with different functionality.

20 Claims, 12 Drawing Sheets

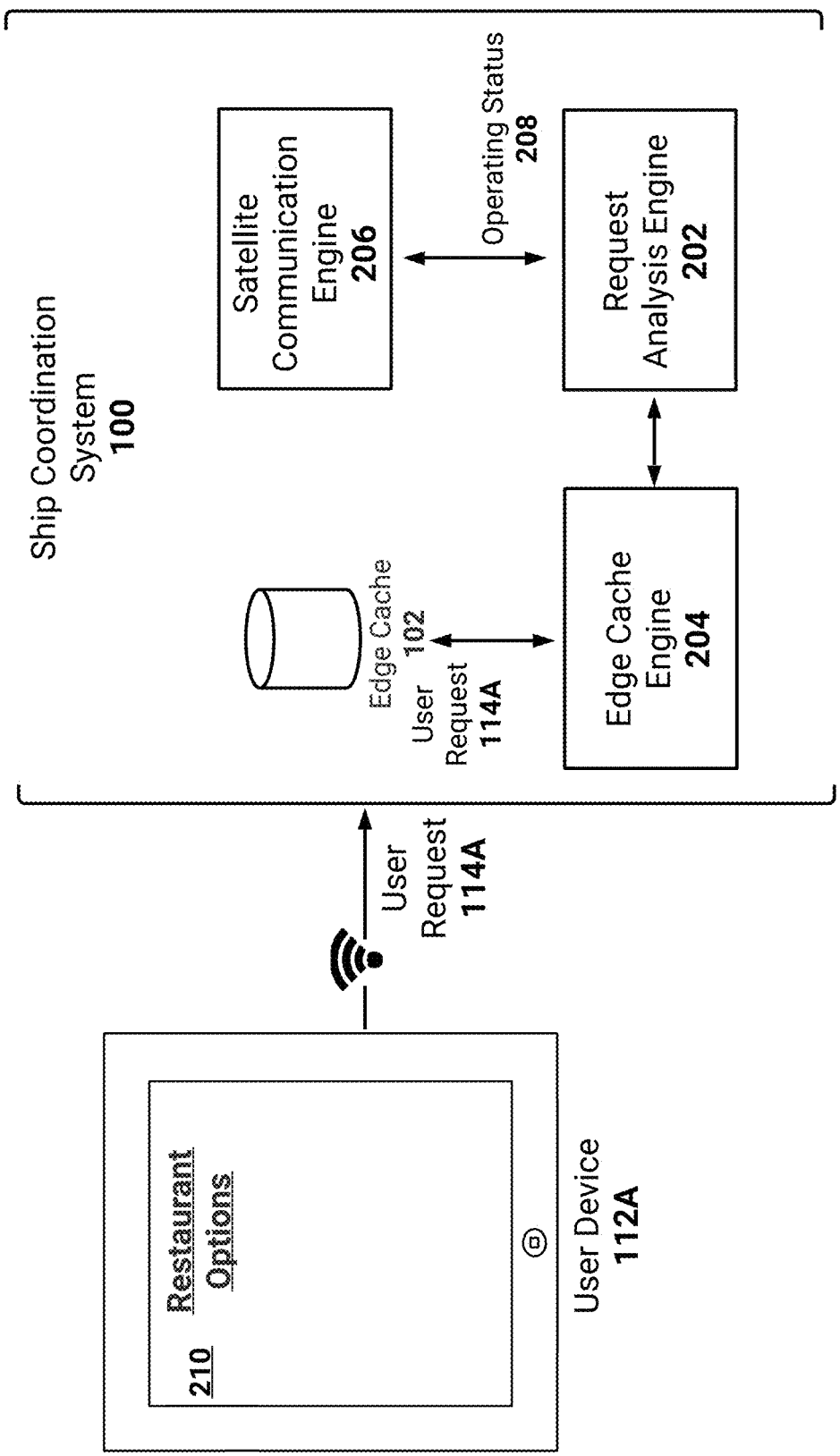

ENHANCED SHIP-BASED NETWORK CONNECTIVITY USING A CONTENT DELIVERY NETWORK (CDN) EDGE SERVER

TECHNICAL FIELD

The present disclosure relates to systems and techniques for ship-based communication. More specifically, this disclosure relates to ship-based communication techniques using an edge cache.

BACKGROUND

Modern passenger ships, such as cruise ships, are increasingly relying upon complex technological setups to function during sailings. For example, a cruise ship may include a substantial number of computers spread about the cruise ship for use by employees. These computers may be used, as an example, to control operation of different activities available to passengers of the cruise ship. An example activity may include an excursion for which a subset of the passengers travels outside of the cruise ship. For this example, computers may be used by employees to reserve space for passengers in the excursion. Another example activity may include eating, and computers may be used by employees to ensure operation of the various restaurants on the cruise ship.

In addition to computers used by employees, a cruise ship may have a central server system which communicates with user devices of passengers. As an example, a passenger may execute an application on his/her user device. The application may allow for the passenger to reserve activities, view information associated with the cruise ship (e.g., a map), contact employees, and so on. As may be appreciated, the central server system may execute a multitude of services which ensure operation of the different application functionality. For example, a service may be used to present available tables for reservation at a restaurant. As another example, a service may be used to synchronize availability of specific spa-appointments between computers used by spa employees.

Use of these different services may result in an increasingly complex technological environment. Additionally, the central server system has an outsized role in a smooth operation of the cruise ship with any downtime being detrimental to, at least, passenger enjoyment.

Furthermore, the central server system connects to user devices of passengers via Wi-Fi accessible locally on the cruise ship. This use of Wi-Fi as the sole access to the services afforded by the central server system reduces the usefulness of the passengers' user devices. For example, a passenger may be on an excursion or otherwise away from the cruise ship. In this example, since the passenger will be unable to connect to the cruise ship's Wi-Fi the user device will have no access to the above-described services. Thus, the application on the passenger's user device will have limited functionality. As an example, the passenger will be unable to rapidly reserve a table to a restaurant or reserve a spot on a time-sensitive excursion while located away from the cruise ship.

SUMMARY OF CERTAIN EMBODIMENTS

The systems, methods, and devices of this disclosure each have several innovative aspects, no single one of which is solely responsible for all of the desirable attributes disclosed herein. Without limiting the scope of this disclosure, example embodiments will now be discussed briefly.

In a first aspect, a system for managing user requests associated with a cruise ship is described. The system comprises a shore-based system comprising one or more computer systems which are configured to: access application information associated with a plurality of web applications, the web applications being associated with operation of the cruise ship, and the web applications being configured to respond to user requests from mobile applications which output user interfaces associated with the web applications, and route user requests to the web applications, the user requests being received from a ship-based system located on the cruise ship, and the user requests causing updating of the application information, wherein responses associated with the user requests are routed to the ship-based system and are usable to update an edge-cache maintained via the ship-based system, the responses comprising at least a portion of the application information; and the ship-based system, the ship-based system being located on the cruise ship and in wireless communication with a plurality of user devices of passengers, and the ship-based system comprising: a satellite communication system, wherein the satellite communication system is configured to route information via a satellite network between, at least, the ship-based system and the shore-based system, and wherein the satellite network is associated with constrained bandwidth, the edge-cache comprising one or more data stores, wherein the data stores are configured to store the portion of the application information associated responses to user requests, and wherein the edge-cache is usable to update the mobile applications being executed by the user devices based on the portion of the application information, and one or computer systems configured to: receive a plurality of user requests from the user devices, wherein the user requests are associated with the mobile applications, and determine an operating status associated with the satellite communication system, the operation status being indicative of the satellite communication system having bandwidth and/or connectivity to route the user requests via the satellite network, wherein based on the operating status being negative: queue a first subset of the user requests, wherein the first subset are transmitted according to the queue based on the operating status being positive, respond, based on information stored in the edge cache, to a second subset of the user requests, wherein responding causes updating of one or more user devices associated with the second subset, and wherein based on the operating status being positive, transmit the user requests via the satellite network to the shore-based system.

The first aspect includes zero or more of the following. The portion of the application information is associated with different time-to-live (TTL) information, wherein each TTL information indicates a threshold amount of time until information is configured to be discarded from the edge-cache or refreshed based on the operating status being positive. The edge-cache is updated according to the TTL information, such that subsets of the portion are updated at different frequencies. Based on the operating status being negative, the one or more computer systems included in the ship-based system are further configured to: analyze request information included in a particular user request from a particular user device, the particular user request being associated with a particular mobile application, generate, based on the request information, information for transmission to one or more devices included in the cruise ship, and cause updating of the particular mobile application executing on the particular user device. The particular mobile application is associated with reserving a service, and wherein the one or more devices are usable by an employee of the cruise ship associated with the service. The particular mobile application is associated with reserving a service, and wherein the particular mobile application is updated to reflect confirmation of the reservation. Based on the operating status being negative, the one or more computer systems included in the ship-based system are further configured to: respond to a particular user request, which is included in the second subset, from a particular user device with a static response, the static response causing updating of the particular mobile application executing on the particular user device, or cause updating of the particular mobile application to present a custom error based on the particular user request, or redirect the particular user request to one or more computers included in the cruise ship, the computer systems being selected based on the particular user request, wherein the particular user request is subsequently transmitted to the shore-based system based on the operating status being positive. When a particular mobile device loses wireless communication with the ship-based system and is in wireless communication with a terrestrial cellular network, the one or more computer systems included in the shore-based system are further configured to: receive a particular user request from the particular mobile device, the particular user request being provided via the cellular network for transmission to the shore-based system; route the particular user request to a particular web application associated with the particular user request, such that application information associated with the particular web application is updated; and cause updating of the particular mobile device. To cause updating of the particular mobile device, the one or more computer systems are configured to route response information from the particular web application to the particular mobile device. The one or more computer systems are configured to: cause updating of the edge cache, wherein the updated edge cache reflects the updated application information associated with the particular web application.

In a second aspect, a method is described. The method is implemented by a system of one or more computers, the system being located on a cruise ship and usable to manage user requests associated with the cruise ship, the method comprising: receiving a plurality of user requests from user devices in wireless communication with the system, wherein the user requests are associated with applications executing on the user devices, and determining an operating status associated with a satellite communication system located on the cruise ship, the operation status being indicative of the satellite communication system having bandwidth and/or connectivity to route the user requests via a satellite network, wherein based on the operating status being negative: queuing a first subset of the user requests, wherein the first subset are transmitted according to the queue based on the operating status being positive, and responding, based on information stored in an edge cache maintained by the system, to a second subset of the user requests, wherein responding causes updating of one or more user devices associated with the second subset, and wherein based on the operating status being positive, transmitting the user requests via the satellite network to a shore-based system, the shore-based system routing the user requests to web applications associated with different functionality.

The second aspect includes zero or more of the following. A response to a particular user request of the first subset is received, and wherein the edge cache is updated based on the response. Information stored in the edge-cache is associated with to time-to-live (TTL) information, wherein each TTL information indicates a threshold amount of time until information is configured to be discarded from the edge cache or refreshed based on the operating status being positive, and wherein the system is configured to update the edge cache to ensure the information does not exceed associated threshold amounts of time. Based on the operating status being negative, the method further comprises: analyzing request information included in a particular user request from a particular user device, the particular user request being associated with a particular application, generating, based on the request information, information for transmission to one or more devices included in the cruise ship, and causing an update of the particular application executing on the particular user device or providing updated information for the particular application to retrieve. The particular application is associated with reserving a service, and wherein the one or more devices are usable by an employee of the cruise ship associated with the service. The particular application is associated with reserving a service, and wherein the particular application is updated to reflect confirmation of the reservation. Based on the operating status being negative, the method further comprises: responding to a particular user request, which is included in the second subset, from a particular user device with a static response, the static response causing updating of a particular application executing on the particular user device, or causing updating of the particular application to present a custom error based on the particular user request, or redirecting the particular user request to one or more devices included in the cruise ship, the devices being selected based on the particular user request.

In a third aspect, non-transitory computer storage media is described. The non-transitory computer storage media stores instructions configured for execution by a system of one or more computers, the system being located on a cruise ship and usable to manage user requests associated with the cruise ship, wherein the instructions cause the system to perform operations comprising: receiving a plurality of user requests from user devices in wireless communication with the system, wherein the user requests are associated with applications executing on the user devices, and determining an operating status associated with a satellite communication system located on the cruise ship, the operation status being indicative of the satellite communication system having bandwidth and/or connectivity to route the user requests via a satellite network, wherein based on the operating status being negative: queuing a first subset of the user requests, wherein the first subset are transmitted according to the queue based on the operating status being positive, and responding, based on information stored in an edge cache maintained by the system, to a second subset of the user requests, wherein responding causes updating of one or more user devices associated with the second subset, and wherein based on the operating status being positive, transmitting the user requests via the satellite network to a shore-based system, the shore-based system routing the user requests to web applications associated with different functionality.

The third aspect includes zero or more of the following. Based on the operating status being negative, the operations further comprise: analyzing request information included in a particular user request from a particular user device, the particular user request being associated with a particular application, generating, based on the request information, information for transmission to one or more devices included in the cruise ship, and causing an update of the particular application executing on the particular user device. The particular application is associated with reserving a service, and wherein the one or more devices are usable by an employee of the cruise ship associated with the service. Based on the operating status being negative, the operations further comprise: responding to a particular user request, which is included in the second subset, from a particular user device with a static response, the static response causing updating of the particular application executing on the particular user device, or causing updating of the particular application to present a custom error based on the particular user request, or redirecting the particular user request to one or more devices included in the cruise ship, the devices being selected based on the particular user request.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 2A is a block diagram of an example embodiment of the ship coordination system receiving a user request from a user device.

Like reference numbers and designations in the various drawings indicate like elements.

DETAILED DESCRIPTION

Overview

Figure 1:
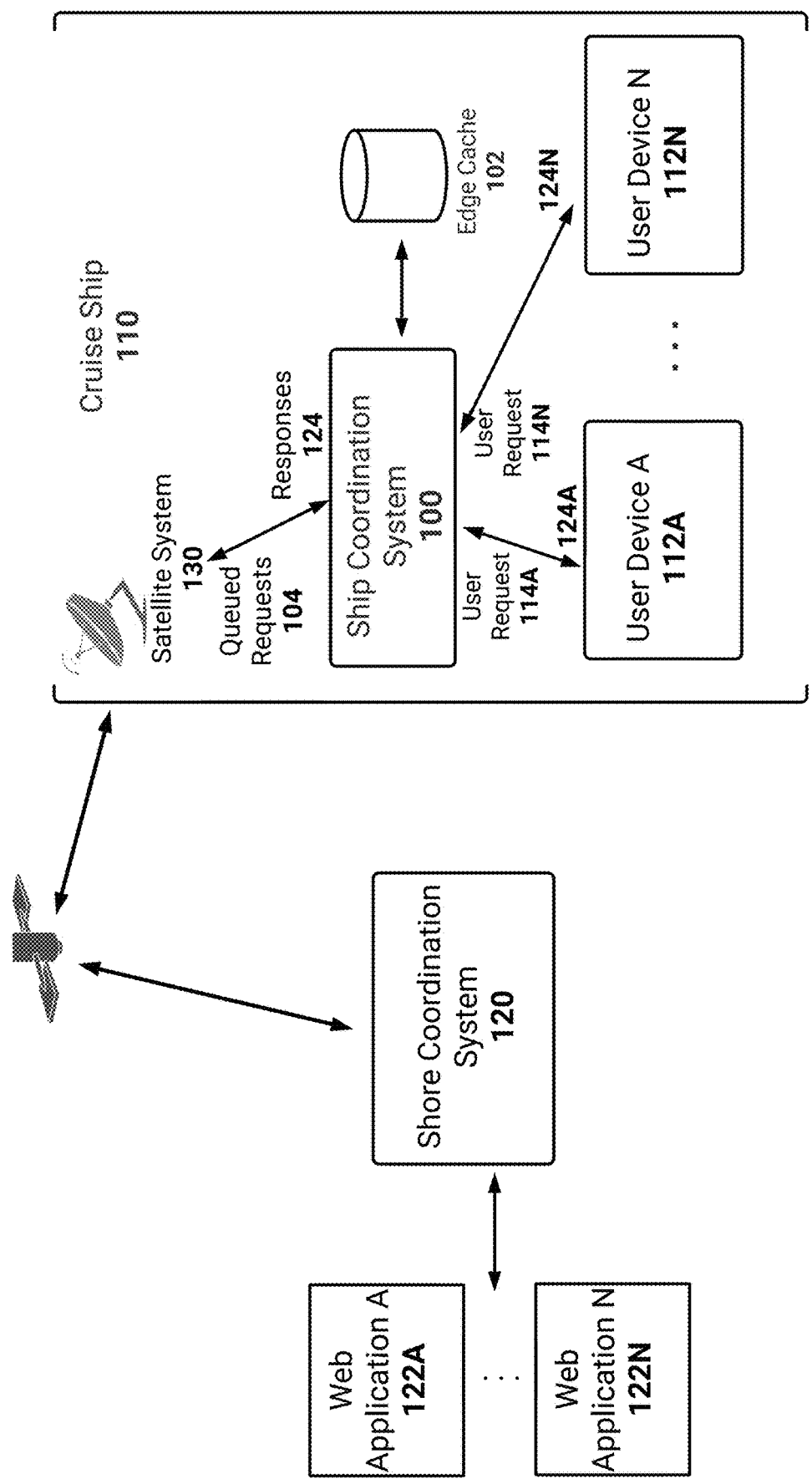
FIG. 1 is a block diagram of an example ship coordination system on a cruise ship in communication with an example shore coordination system.

This specification describes, among other things, a system for inclusion on a passenger ship which efficiently manages use of a satellite connection based on bandwidth and/or uptime constraints. As will be described, the system (herein referred to as the ship coordination system 100) may be in communication with a shore-based system (herein referred to as the shore coordination system 120) which hosts, or is otherwise in communication with, a multitude of web applications. Each of the web applications may provide functionality usable by, or otherwise interactable with, passengers of the cruise ship. For example, the passengers may use user devices which execute an application (e.g., a mobile application) usable to access the functionality. Example functionality may include reserving activities, viewing sailing information, viewing a map of the cruise ship, interacting with employees of the cruise ship, and so on.

As will be described, use of web applications may substantially simplify a technical environment on the cruise ship. For example, prior techniques to allow for passengers to use their user devices to reserve activities relied upon a central server system located on the cruise ship. In this example, the central server system may communicate with the user devices via Wi-Fi and execute a multitude of micro-services to handle user requests.

In contrast, the techniques described herein allow for a simplified ship-based system which routes user requests to the shore-based system. For example, use of a simplified ship-based system and shore-based system allows for a multitude of different cruise ships to route user requests to the same web applications. In this way, the web applications may provide a consistent user experience to passengers across the cruise ships. Additionally, the web applications may be updated without having to separately update micro-services on each of the cruise ships. For example, in a technical environment in which ship-based systems execute micro-services to provide functionality, if the functionality is updated then all ship-based systems across a fleet of cruise ships will need to be updated.

Due to the web applications being accessible via the above-described satellite connection, as may be appreciated the connection may get saturated. For example, passengers may rapidly try to access functionality afforded by the web applications. As an example, the passengers may provide a multitude of user requests associated with reserving space at restaurants proximate to dinner time. Additionally, the satellite connection may experience downtime due to inclement weather experienced during a sailing of the cruise ship.

Advantageously, the system may use an on-board content delivery network (CDN) edge cache to reduce a burden on the satellite connection and enhance the passenger user experience. For example, the edge cache may store information which is usable to respond to at least a portion of the user requests. In this example, the edge cache may replicate some, or all, of information associated with the web applications. As an example, the edge cache may store a map of the cruise ship. Thus, if a passenger uses his/her user device to request the map, the system may service the user request directly from the edge cache. As another example, the edge cache may store information indicating available tables in an on-board restaurant.

Thus, certain types of user requests (e.g., reads) may be serviced by the system using the edge cache. In this way, a quantity of user requests which need to be routed via the satellite connection to the shore-based system may be reduced. As will be described, the edge cache may be refreshed according to different techniques. For example, information stored in the edge cache may be associated with time-to-live (TTL) information.

Other types of user requests (e.g., writes) may be routed by the system to the above-described shore-based system. For example, a passenger may use his/her user device to reserve a table at a particular on-ship restaurant. In this example, the reservation will modify information (e.g., modifying available tables). Thus, the system may route the user request to a web application associated with reserving tables. In this way, the web application may modify the information. In response, the web application may provide a confirmation of the reservation to the passenger's user device. The edge cache may additionally be updated based on the response, such that the edge cache reflects a current state of available tables.

For the above-described user requests (e.g., writes), the system may thus utilize the satellite connection to transmit the user requests. Since, as described above, the satellite connection may get saturated or may be temporarily unable to transmit, the system may place user requests in a queue. The system may then service the user requests based on the queue.

In some embodiments, the system may provide a response for a user request placed in the queue. For example, the system may provide a response indicating an error message or a temporary delay in servicing the user request. As another example, the system may provide information to a device or system used by an employee of the cruise ship. With respect to the example of reserving a table at a restaurant, the system may provide information to an employee associated with the restaurant. For example, the system may route the user request to the employee. In this way, the employee may directly reserve the table thus avoiding a wait due to the satellite connection being unavailable.

This application therefore describes technical enhancements with respect to communication techniques on cruise ships. Prior communication techniques relied upon a central server located on a cruise ship. Use of such a central server requires continuous upkeep and adjustment. For example, software executing on the central server may need to be routinely updated. As may be appreciated, managing a fleet of cruise ships may therefore be complicated due to this routine updating. Additionally, the central server will be required to execute multitudes of micro-services to allow for functionality which passengers are increasingly expecting. These micro-services may need to be updated over time, or new micro-services may need to be added. Thus, each instance of the micro-services across the fleet will need updating. Furthermore, due to the complexity of such a central server, the likelihood of downtime is substantially greater than the techniques described herein. Any downtime, as may be appreciated, may reduce a user experience associated with the cruise ship.

In contrast, the techniques described herein use a satellite system to route user requests to a shore-based system. The shore-based system may represent a cloud system or software executing on a cloud-based system. Thus, the shore-based system may be easily managed (e.g., remotely managed) via IT-focused employees. Thus, downtime may be minimized in contrast to a central server system on a cruise ship due to potential lack of IT-focused employees on each ship. Advantageously, an edge cache may be used to ensure that user requests are rapidly serviceable thus masking the use of any downtime associated with the satellite system. In this way, the technical requirement of the satellite (e.g., due to lack of other communication techniques while on open ocean) may provide a benefit while disadvantages may be reduced.

Furthermore, and as will be described in FIGS. 7-8, current communication techniques disallow passengers from accessing the above-described functionality while not connected to a cruise ship's Wi-Fi (e.g., the central server is accessible only via Wi-Fi). For example, while on an excursion on land a passenger will be unable to use his/her user device to reserve a table at a restaurant. In contrast, the techniques described herein allow the passenger to use a terrestrial network (e.g., cellular service or local Wi-Fi. As an example, the shore-based system may receive information from the passenger's user device via the terrestrial network. The shore-based system may thus allow for reservation of a table. Subsequently, the reservation may be provided to the system for updating of the edge cache. In this way, the techniques described herein allow address technical deficiencies with respect to existing techniques.

While the description herein focuses on use of an edge cache, in some embodiments the techniques described herein may be complementary to a central system on a cruise ship which executes micro-services. For example, local cruise ship requests may be routed to the central system while other requests may leverage the edge cache. As another example, a portion of user requests may be routed to the central system while other requests may use the edge cache.

Block Diagrams

FIG. 1 is a block diagram of an example ship coordination system 100 located on a cruise ship 110 in communication with an example shore coordination system 120. The cruise ship 110 may represent a ship on which greater than a threshold number of passengers stay (e.g., 20 passengers, 100 passengers, 500 passengers, 5000 passengers, and so on). Each passenger may have a user device (e.g., user devices 112A-112N) on the cruise ship 110, such as a mobile device, a tablet, a wearable device, a laptop, and so on. As illustrated, the cruise ship 110 includes a satellite system 130 which transmits information to the shore coordination system 120.

The ship coordination system 100 may represent a system of one or more computers which is accessible via a local network on the cruise ship 110 (e.g., a Wi-Fi network). The user devices 112A-112N may thus connect to the local network, such that the ship coordination system 100 may be in communication with the user devices 112A-112N. The ship coordination system 100 may communicate with applications which execute on the user devices 112A-112N. For example, the mobile applications may represent mobile applications which are obtained from an online application store. As another example, the applications may represent web applications which are accessible via respective web browsers executing on the user devices 112A-112N. The ship coordination system 100 may additionally communicate with custom applications or software executing on user devices 112A-112N, which may be kiosks or terminals spread about the cruise ship 110.

The above-described application may represent a front-end application usable by the passengers during a sailing of the cruise ship 110. For example, the application may allow the passengers to perform disparate functionality associated with the sailing. As an example, the application may allow for a passenger to reserve a table or seating at one of a multitude of restaurants on the cruise ship 110. As another example, the application may allow for a passenger to view a list of activities which are available to the passenger. As another example, the application may allow for a passenger to view a map of the cruise ship 110 or a location on the cruise ship 110 of his/her cabin. As another example, the application may allow for a passenger to communicate with employees of the cruise ship 110. As another example, the application may allow for a passenger to reserve tickets to a show which is occurring on the cruise ship 110. As another example the application may allow for a passenger to order room service to his/her cabin on the cruise ship 110.

The application, as an example, may thus provide a front-end user interface for the above-described functionality. A passenger may use the application to perform an action which triggers a user request (e.g., user request 114A) to the ship coordination system 100. For example, the passenger may prefer to reserve a table at a specific restaurant. In this example, the passenger's user device 112A may thus provide a user request 114A which is indicative of the reservation to the ship coordination system 100.

The functionality described above may be implemented by one or more web applications (e.g., web applications 122A-122N) which are in communication with the shore coordination system 120. Web applications, by way of example, may include web applications, microservices, services, databases, application programming interface (API) gateways, custom third-party services, and so on. In some embodiments, the shore coordination system 120 may represent a system of one or more computers or software executing on a system of one or more computers. For example, the system 120 may be executed as software on a cloud-system. Different back-end applications (e.g., web applications 122A-122N) may be used to implement the disparate functionality described above.

In some embodiments, each web application may represent an endpoint at which a user request is directed. For example, each web application may respond to representation state transfer (REST) endpoints which are associated with implementing different functionality. In this example, one or more REST endpoints may be associated with reservations on the cruise ship 110. Thus, a user request may be transmitted via the satellite system 130 to the shore coordination system 120 with the user request being directed to a particular URL associated with a web application. In addition to the particular URL, the user request may identify a specific task to be performed (e.g., putting a reservation in place to modify tables which are available).

While the web applications 122A-122N are illustrated as being separate, as may be appreciated these web applications 122A-122N may be combined. Additionally, the web applications 122A-122N may represent web servers which are responsive to user requests. Furthermore, the web applications may be containerized web applications which are deployed via the shore coordination system 120.

In the illustrated example, the user devices 122A-122N are providing user requests 114A-114N to the ship coordination system 100. The user requests 114A-114N may represent, as an example, read requests, write requests, and so on. With respect to a read request, the ship coordination system 100 may respond to the read request using information obtained from an edge cache 102.

As described herein, the edge cache 102 may be used to locally store (e.g., cache) information associated with the web applications 122A-122N. For example, the edge cache 102 may replicate at least a portion of the application information stored by web applications 122A-122N. In this example, the edge cache 102 may update based on responses 124 received by the ship coordination system 100 from the shore coordination system 120. For example, a user request 114A may indicate a request for current available tables at a particular restaurant. In this example, the ship coordination system 100 or edge cache 102 may store information reflecting the user request 114A. Upon receipt of a response 124A, the ship coordination system 100 or edge cache 102 may store the response 124A (e.g., as being associated with the request 114A, such as via a response signature).

The edge cache 102 may therefore store information received from web applications 122A-122N during a sailing. In this way, the ship coordination system 100 may respond to a user request without transmitting the user request via the satellite connection 130. For example, the ship coordination system 100 may analyze a received user request and determine whether the edge cache 102 has a stored response. In this example, and with respect to an endpoint, the ship coordination system 100 may determine whether the edge cache stores a response to a same endpoint.

Information stored in the edge cache 102 may be associated with time-to-live (TTL) information, such that information which is older than the TTL is discarded. In some embodiments, the ship coordination system 100 may request an update from the shore coordination system 120 for discarded information or information within a threshold amount of time of being discarded. For example, the ship coordination system 100 may transmit a request to the shore coordination system. In this example, the request may be similar to that of a user request associated with information which is being discarded.

Information associated with expired TTL or about to be expired (e.g., within a threshold amount of time) may be retained in the edge cache 102 beyond the TTL expiration such that users have the last known good response. For example, the information may be retained if the satellite is not operable. The information may then be retrieved once the satellite is operable (e.g., according to priority as described herein).

In some embodiments, the edge cache 102 may be updated (e.g., hydrated, refreshed) with information prior to a sailing of the cruise ship 110. For example, the ship coordination system 100 may cause information associated with the web applications 122A-122N to be stored in the edge cache 102. As an example, the system 100 may request that the shore coordination system 120 provide the information from the web applications 122A-122N. This information may reflect initial states for the web applications 122A-122N which passengers may request. As an example, the edge cache 102 may store information reflecting available restaurants, excursions, activities, and so on. During the sailing, passengers may provide user requests associated with reading this information. Thus, the ship coordination system 100 may respond to the user requests based on information stored in the edge cache 102. As the information is updated during the sailing, for example if an activity fills up and is thus inaccessible to passengers, the edge cache 102 will be similarly updated.

As may be appreciated, use of an edge cache has example advantages over a traditional database which may be deployed on a cruise ship. Response signatures can change for an endpoint based on the request such that different data, fields, etc. can be stored in the edge cache exactly as it was produced from the cloud-based REST API through the satellite system. Once configured, and as an example, the edge cache does care what the response contains. In the case of a database storing equivalent data on a cruise ship, it is typical to have a custom service (e.g., microservice, server, web application) that reads the database and serializes data into an API response locally on the cruise ship. This is an example advantage of the edge cache as it avoids deploying that custom microservice to all cruise ships and associated deployment/versioning complexity is avoided as the data evolves and changes over time.

For user requests which modify information, such as write requests, the ship coordination system 100 may transmit these requests to the shore coordination system 120. As described above, the system 120 may then route the user requests to the web applications 122A-122N.

The satellite system 130, as described herein, may have limited bandwidth. For example, the satellite system 130 may have constraints based on an amount of data it can provide in a period of time. As another example, the satellite system 130 may have constraints according to a number of user requests which can be transmitted in a period of time. Additionally, the satellite system 130 may experience times at which it is unable to transmit based on weather conditions or failure of the satellite system 130.

Thus, the satellite system 130 may be unable to transmit a particular user request once the ship coordination system 100 receives it. For example, and as described herein, the operating status of the satellite system 130 may be negative. As will be described in more detail below, user requests may thus be queued to form queued requests 104. The ship coordination system 100 may cause transmission of user requests from the queued requests 104 as the operating status is updated to be positive.

In some embodiments, user requests in the queued requests 104 may be associated with different priorities. For example, a user request which is associated with reserving a table at a restaurant may be associated with a first priority. Optionally, different restaurants, or other reservable items, may be associated with different priority levels. As an example, the ship coordination system 100 may store information identifying a likelihood of a restaurant filling up quickly. In some embodiments, the system 100 may monitor how quickly each restaurant is reserved and assign a higher priority to a restaurant which fills up faster. Thus, a first user request associated with reserving a table at a first restaurant may have a higher priority than a second user request associated with reserving a table at a second restaurant. The system 100 may thus select the first user request for transmission prior to the second user request.

As another example of a priority, a user request associated with reserving an excursion may have a lower priority. For example, excursions may largely be able to be increased in size. In this example, the user request may thus be effectively moved back in the queued requests 104. As another example, user requests may be transmitted from employees on the cruise ship 110. These user requests may be prioritized over user requests from passengers of the cruise ship 110. As an example, an employee may indicate that a particular excursion is being canceled or that a restaurant will be closed at a particular time.

The priority may also be assigned to requests associated with refreshing the edge cache 102. As described above, the edge cache 102 may discard information which is stale, or which is about to be stale based on TTL information. Thus, requests to update the edge cache 102 may be assigned a high priority such that these requests are serviced first or substantially first when the operating status of the satellite system 130 becomes positive.

In some embodiments, the ship coordination system 100 may store user requests in the queued requests 104 based on the operating status of the satellite system 130 being negative. In some embodiments, the ship coordination system 100 may store a subset of user requests in the queued requests 104 based on a metric associated with bandwidth available to servicing user requests from passengers. For example, the satellite system 130 may be configured to transmit information which is separate from user requests from passengers. In this example, the separate information may include information required by governmental entities or information from employees on the cruise ship 110. Thus, the ship coordination system 100 may constrain the bandwidth which is available to passengers. If greater than a threshold number of user requests are received from passengers, the ship coordination system 100 may store user requests in the queued requests 104 to ensure that the bandwidth constraint is met.

FIG. 2A is a block diagram of an example embodiment of the ship coordination system 100 receiving a user request from a user device 112A. In the illustrated example, user device 112A is presenting a user interface 210 associated with restaurant options. The user interface 210 may be rendered by an application executing on the user device 112A, such as described in FIG. 1.

The user device 112A is illustrated as providing a user request 114A to the ship coordination system 100. For example, a passenger using the user device 112A may have navigated to a portion of the application associated with restaurant options. To obtain the restaurant options, the application may transmit the user request 114A to the ship coordination system 100 (e.g., via Wi-Fi). As may be appreciated, the user request 114A may thus be a read request. The response to the user request 114A may include information indicative of restaurant options.

The ship coordination system 100 includes a request analysis engine 202. In some embodiments, the request analysis engine 202 may identify whether the received user request 114A is a read or write. With respect to the user request 114A being associated with an endpoint, the request analysis engine 202 may identify whether the endpoint is associated with adjusting information. Additionally, the request analysis engine 202 may identify whether an action to be performed via the endpoint is related to a read (e.g., a 'GET' request). As will be described, for a read request the request analysis engine 202 may then cause an identification as to whether the edge cache 102 stores a response.

The ship coordination system 100 additionally includes an edge cache engine which manages the edge cache 102. For example, the edge cache engine may determine whether the user request 114A can be serviced based on the edge cache 102. In this example, the edge cache engine 204 may identify whether a response to a same user request has been previously received. As an example with respect to restaurant options, the user request 114A may be the same as prior user requests used by passengers to view the restaurant options. In some embodiments, the user requests may be similar but distinct. For example, the user request may indicate information associated with a requesting passenger. As another example, the user request may depend on a type of user device or operating system which is executed on the user device 112A. Thus, the edge cache engine 204 may use a portion of the user request to determine whether a similar request had been received. The portion may reflect, for example, an endpoint associated with the user request.

In this way, the edge cache engine 204 may determine that a response to a same, or similar, user request is stored in the edge cache 102. Additionally, the edge cache engine 204 may identify that the stored response is not stale (e.g., the TTL time limit has not been exceeded). If the edge cache engine 204 identifies that the stored response is stale, the edge cache engine 204 may cause a request for an updated version of the response from the shore coordination system 120.

The ship coordination system 100 further includes a satellite communication engine 206 which controls, or otherwise monitors, the satellite system 130 illustrated in FIG. 1. The satellite communication engine 206 may provide information indicating an operating status 208 of the satellite system 130. For example, the operating status may reflect a positive or negative operating status. In this example, the positive operating status may indicate that the satellite system 130 can transmit information (e.g., to the shore coordination system 120).

Similarly, the negative operating status may indicate that the satellite system 130 is not able to transmit information. As an example, the satellite system 130 may have exceeded assigned bandwidth limits. As another example, the satellite system 130 may be transmitting greater than a threshold metric of information associated with a priority level which exceeds that of the user request 114A. As another example, the satellite system 130 may be unable to transmit due to weather.

Figure 2B:
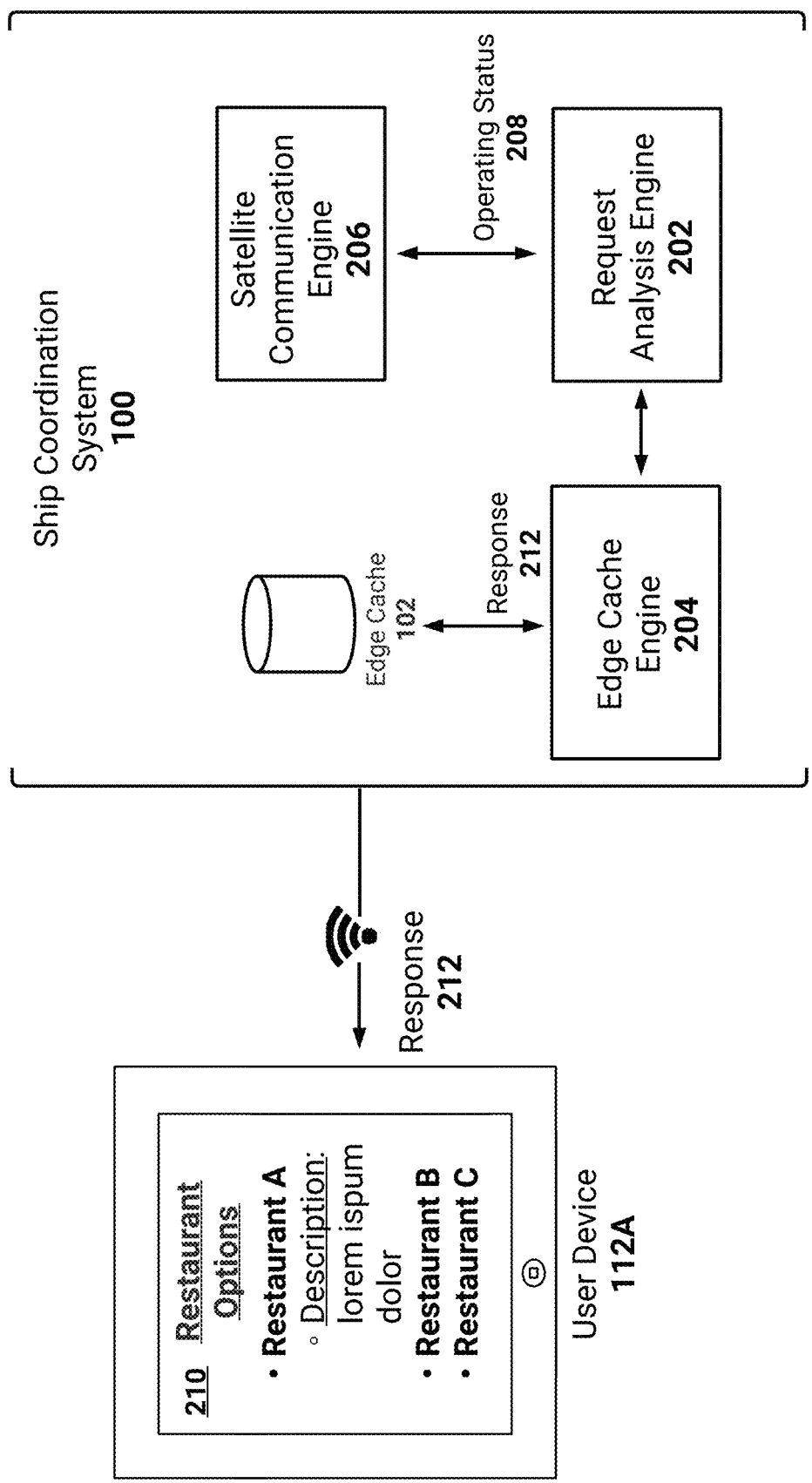
FIG. 2B is a block diagram of the ship coordination system providing a response to the user device based on an edge cache.

FIG. 2B is a block diagram of the ship coordination system 100 providing a response 212 to the user device 112A based on the edge cache 102. In the illustrated example, the edge cache 102 has provided a response 212 to the user request 114A. The response 212 may thus reflect the available restaurants. The user interface 210 has been updated to present Restaurants A-C along with an example description of Restaurant A. For example, a passenger of the user device 112A may have selected Restaurant A.

As may be appreciated, use of the edge cache 102 avoids transmitting all user requests to the shore coordination system 120. Thus, for certain user requests (e.g., reads) the ship coordination system 100 may directly provide responses. As will be described below with respect to FIGS. 3A-3D, for other user requests (e.g., writes) the ship coordination system 100 may transmit the requests to the shore coordination system 120.

FIGS. 2A-2B described using the edge cache to directly respond to the user request 114A. As may be appreciated, the edge cache 102 may not yet store information usable to respond to the user request 114A. For example, the information in the edge cache may be stale or a same, or similar, user request may not have been received. Thus, the ship coordination system 100 may transmit the user request 114A to the shore coordination system 120 (e.g., illustrated in FIG. 1). The response from the shore coordination system 120 may then be used to update the edge cache 102.

Figure 3A:
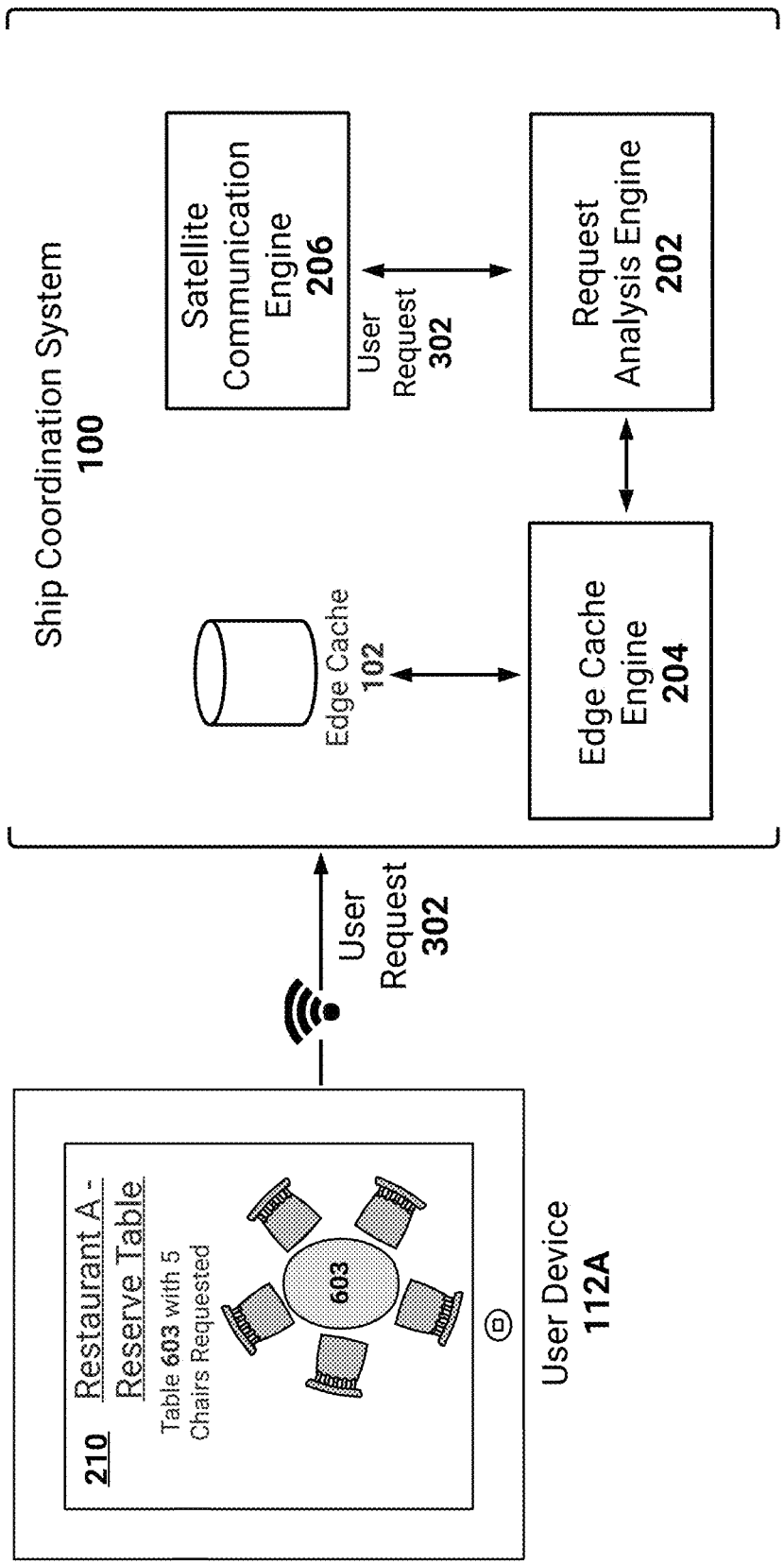
FIG. 3A is a block diagram of another example embodiment of the ship coordination system receiving a user request from a user device.

FIG. 3A is a block diagram of another example embodiment of the ship coordination system 100 receiving a user request 302 from the user device 112A. In the illustrated example, the user interface 210 (e.g., described in FIGS. 2A-2B) has been updated based on user input to reserve a table at Restaurant A. For example, user interface 210 may indicate tables which are available at Restaurant A. In this example, the ship coordination system 100 may have provided the available tables via information stored in edge cache 102. Thus, and as illustrated, a passenger using user device 112A has selected a particular table (e.g., table 603) for 5 persons.

The selection has triggered user request 302 to the ship coordination system 100. The user request 302 may cause a modification of the tables which are available, and therefore represents a write. The request analysis engine 204 may identify that the user request 302 is a write, for example based on an endpoint or task to be performed by the user request 302. As illustrated, the request analysis engine 204 may thus provide the user request 302 to the satellite communication engine 206 for transmission to the shore coordination system 120.

In some embodiments, the ship coordination system 100 may reserve the table for the passenger without transmitting the user request 302 to the shore coordination system 120. For example, the ship coordination system 100 may determine that the table is available based on an analysis of the information stored in the edge cache 102. In this example, the system 100 may determine that table 603 has not yet been reserved based on analyzing available tables. The system 100 may thus provide a response to the user device 112A indicating the reservation of table 603. The user request 302 may be subsequently transmitted, for example in a batch of user requests, to the shore coordination system 120 to update a web application associated with reserving tables. The system 100 may optionally analyze user requests which have been received prior to user request 302. For example, the system may identify whether any user requests, which have not yet been transmitted to the shore coordination system 120, are associated with reserving table 603. Based on a positive identification, the system may provide a response to the user device 112A indicating unavailability of table 603.

Figure 3B:
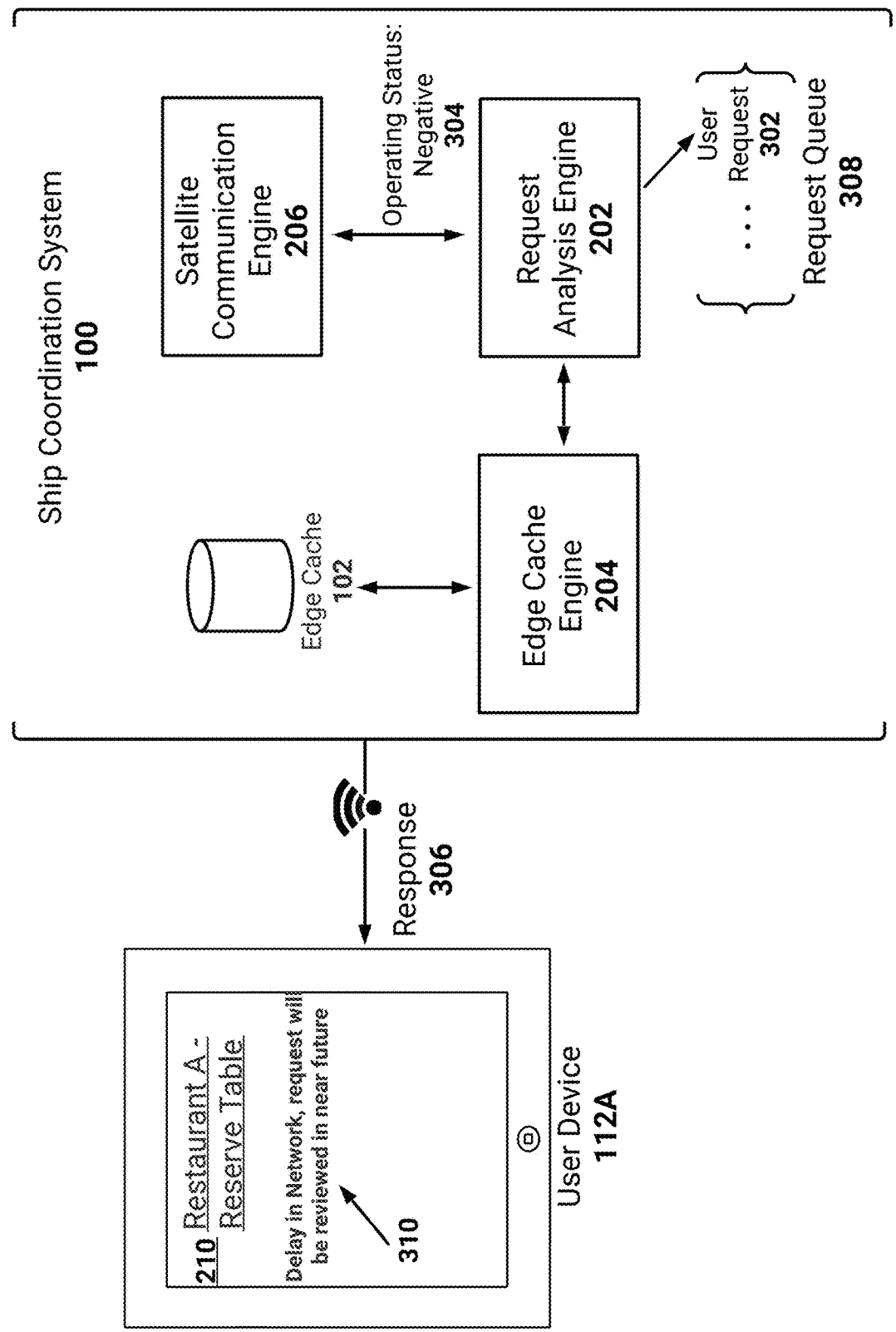
FIG. 3B is a block diagram of the ship coordination system providing a first response to the user device.

FIG. 3B is a block diagram of the ship coordination system providing a first response to the user device. In the illustrated example, the operating status 304 of the satellite system 130 (e.g., illustrated in FIG. 1) is indicated as being negative. For example, in response to the user request 302 being provided by the request analysis engine 202 to the satellite communication engine 206, the engine 206 may respond with a negative operating status 304. In some embodiments, the request analysis engine 202 may monitor the operating status 304 (e.g., as a pull) rather than being pushed the operating status 304.

Due to the unavailability of the satellite system 130, the request analysis engine 202 has stored user request 302 in a request queue 308. As described above, with respect to FIG. 1, the ship coordination system 100 may transmit user requests stored in the queue based on the operating status 304 being updated to be positive.

In some embodiments, the ship coordination system 100 may provide a custom response 306 to the user device 112A. For example, user interface 210 has been updated to reflect a custom message 310. In this example, the custom message 310 is a static response indicating a delay in the network. Thus, the passenger of the user device 112A may identify that the satellite system 130 is presently unable to transmit information. In some embodiments, the custom message 310 may represent an error message. An example error message may request that the passenger try again later or may indicate that the passenger's request will be automatically tried again at a later time.

The custom response 306 may be set by employees of the cruise ship and may vary according to a type of the user request. For example, the custom message 310 may vary according to an endpoint associated with a user request and/or a web application which is to respond to the user request. In this way, the ship coordination system 100 may allow for a custom back end to handle certain types of user requests.

Figure 3C:
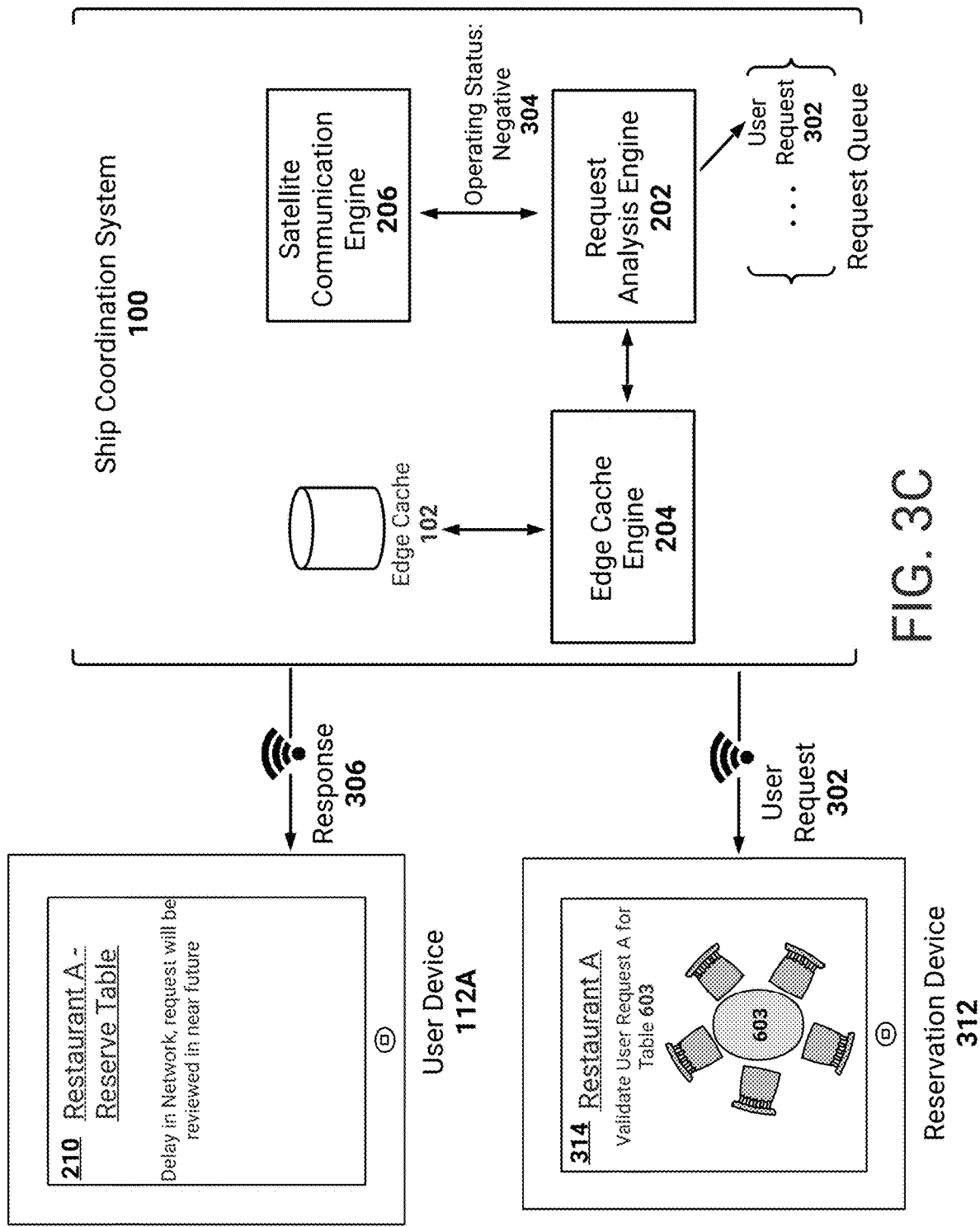
FIG. 3C is a block diagram of the ship coordination system routing the user request to a reservation device.

FIG. 3C is a block diagram of the ship coordination system 100 routing the user request 302 to a reservation device 312. In addition to providing a custom response 306 for presentation via user device 112A, in some embodiments the ship coordination system 100 may provide the user request 302 to a system or device used by employees of the cruise ship. For example, the request analysis engine 202 may identify that the user request 302 is associated with the above-described custom back end. In this example, the request analysis engine 202 may identify that an endpoint associated with the user request 302 may trigger, or be indicative of, routing the user request 302 to a particular system/device or set of systems/devices. The user request 302 may also be accessible via applications executing on user devices of employees. For example, a portion of an application used by employees may be associated with user requests which are not yet able to be transmitted by the satellite system 130 (e.g., illustrated in FIG. 1). In this way, the employees may directly service the requests.

In FIG. 3C, the user request 302 is routed to a reservation device 312. This device 312 may represent a system or device which is used by employees of Restaurant A. The ship coordination system 100 may therefore use information included in the user request 302, such as a textual string or label associated with a restaurant, to route the user request 302. The reservation device 312 may also be a device or system used by employees associated with any of the restaurants.

As illustrated, the reservation device 312 is presenting a user interface 314 usable to validate the user request 302. An employee using the reservation device 312 may view information included in the user request 302, such as the specific table being requested at Restaurant A. Due to the employee having access to internal information reflecting availability of tables, the employee may effectuate the reservation of the requested table.

In some embodiments, the ship coordination system 100 may receive a response from the reservation device 312 indicating a successful reservation. Based on this received response, the ship coordination system 100 may provide a response to the user device 112A confirming the reservation. The response may include information reflecting the successful reservation, which the application may use to update the user interface 210.

The description above focused on the user request 302 being routed to the reservation device 312. However, in some embodiments the ship coordination system 100 may provide information determined, or derived, from the user request 302. For example, the request analysis engine 202 may extract information from the user request 302 identifying one or more of the specific restaurant, the table being requested, and information reflecting a passenger requesting the reservation.

Figure 3D:
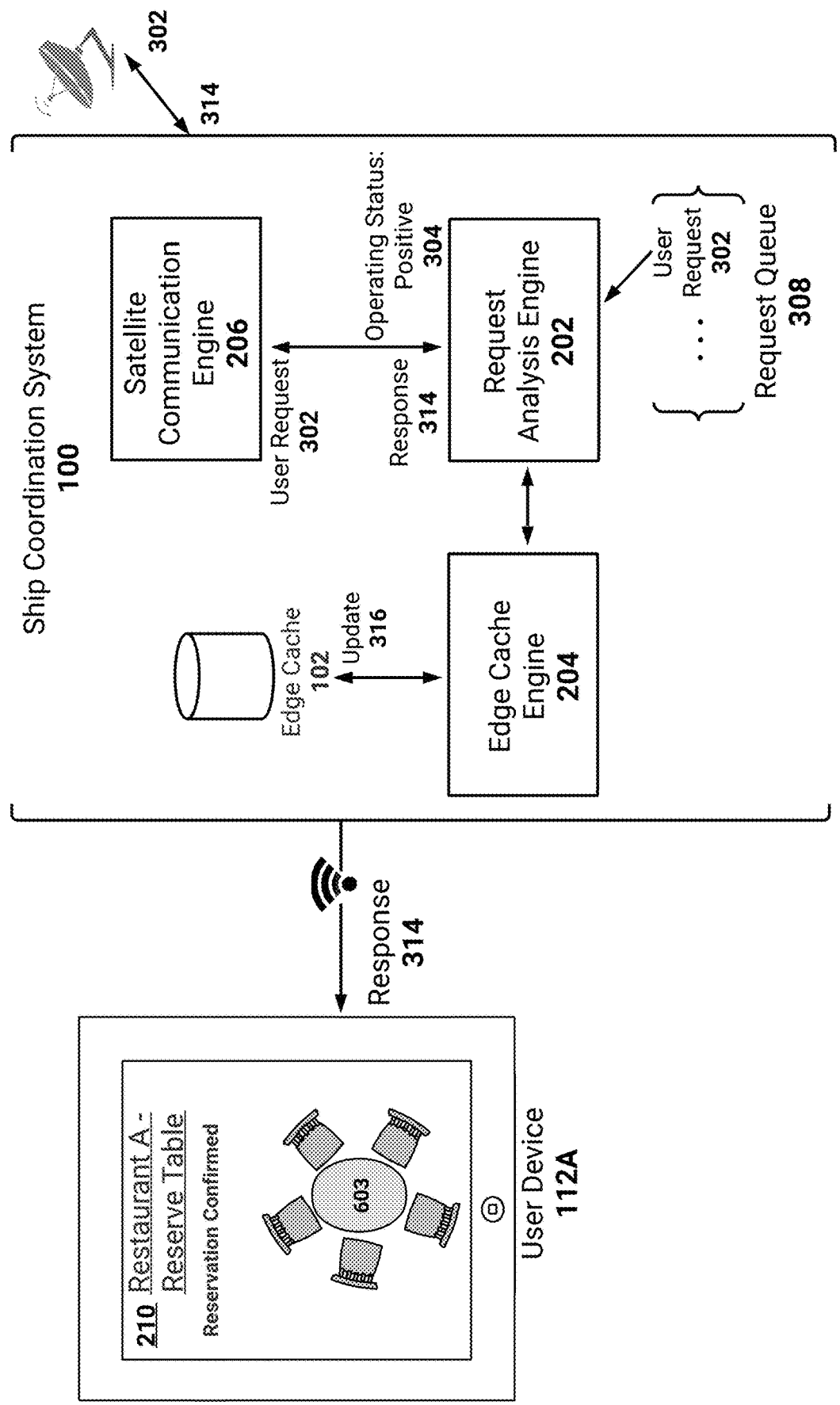
FIG. 3D is a block diagram of the ship coordination system providing a second response from the shore coordination system to the user device.

FIG. 3D is a block diagram of the ship coordination system 100 providing a second response from the shore coordination system 120 to the user device 112A. As illustrated, the operating status 304 has been updated to be positive. The request analysis engine 202 has thus obtained user request 302 from the request queue 308 and transmitted the request 302 via the satellite system 130 (e.g., illustrated in FIG. 1). In response to the user request 302, the ship coordination system 100 has received response 314. For example, the shore coordination system 120 (e.g., illustrated in FIG. 1) may have routed user request 302 to a web application associated with reserving tables. The response 314 from the web application may then be provided to ship coordination system 100.

In some embodiments, the edge cache engine 204 may provide an update 316 to the edge cache 102. For example, the response 314 may reflect a current availability of tables at Restaurant A. As another example, the response 314 may reflect the reservation and the system 100 may update the current availability to remove the reserved table. In this example, the edge cache 102 may be updated to reflect the current availability. Thus, if a different passenger provides a user request to view available tables at Restaurant A, the user request may be serviced rom the edge cache.

In the illustrated example, the user interface 210 has thus been updated to reflect the successful reservation. For example, the application executing on the user device 112A may update the user interface 210 based on the received response 314.

Flowcharts

Figure 4:
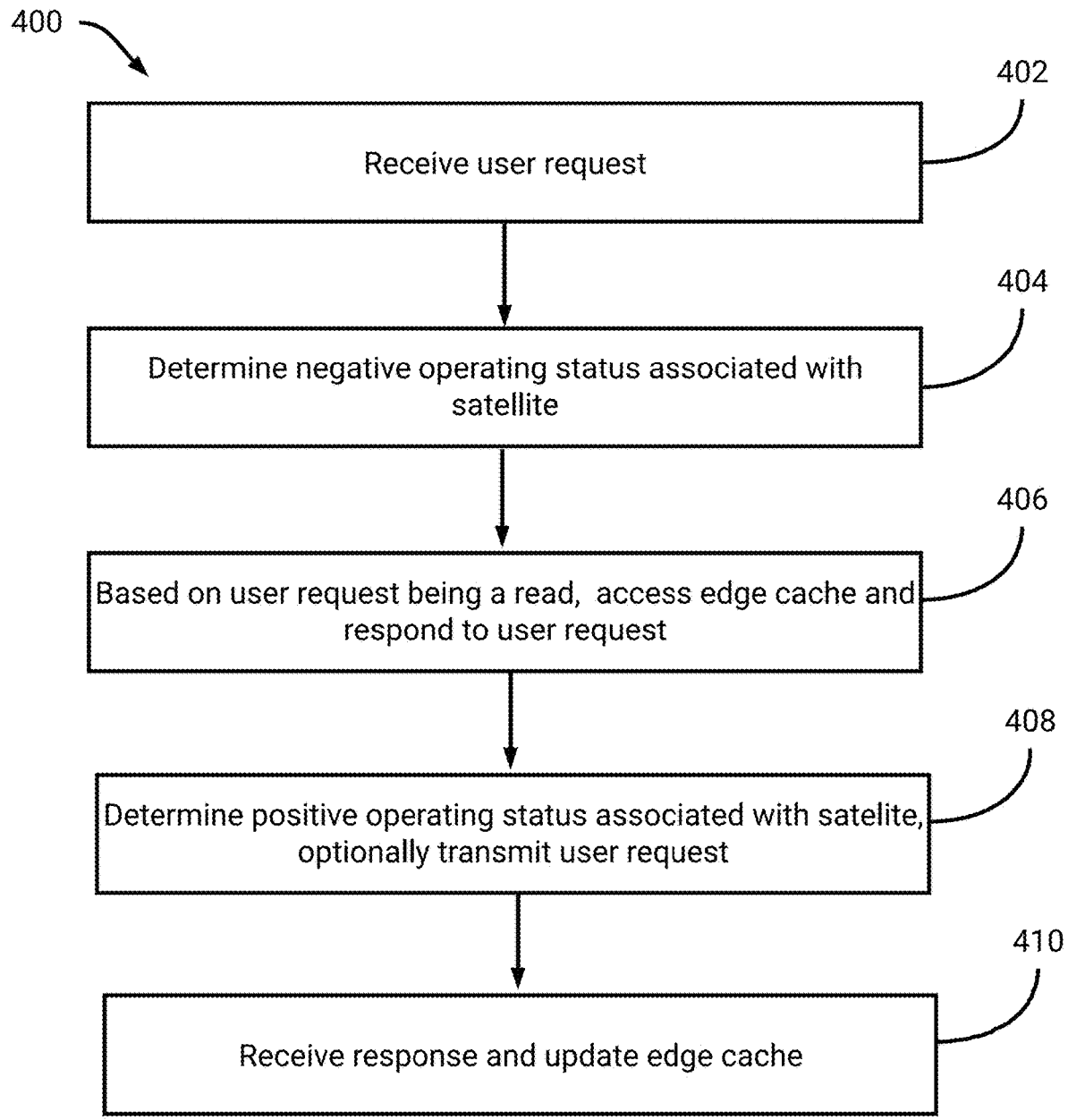
FIG. 4 is a flowchart of an example process for responding to a user read request from an application.

FIG. 4 is a flowchart of an example process 400 for responding to a user read request from an application. For convenience, the process 400 will be described as being performed by a system of one or more computers (e.g., the ship coordination system 100) included in a cruise ship.

At block 402, the system receives a user request from a user device. As described above, the system may be in communication with a multitude of user devices used by passengers of the cruise ship.

At block 404, the system determines a negative operating status associated with a satellite system. The system may identify whether the satellite system, which is described above with respect to FIG. 1, is able to transmit the user request. For example, the satellite system may be configured to transmit the user request to a shore-based system (e.g., system 120). As described herein, the negative operating status may indicate that the satellite system is presently unable to transmit information.

At block 406, the system accesses an edge cache based on the user request being a read. Since the user request will not modify information, the edge cache may be used to service the user request. As described in FIGS. 2A-2B, the system identifies whether a same, or similar, user request has previously been received. The system then determines whether a response received from the shore-based system received is stale. If the information is not stale, the system then responds to the user request based on the edge cache.

At block 408, the system optionally transmits the user request based on the operating status of the satellite system being positive. The system may transmit the user request based on the response stored in the edge cache being within a threshold amount of time of being stale (e.g., expiring based on time-to-live information) or being presently stale. The system may also identify whether any write user requests associated with a same endpoint or web application have been transmitted since the response in the edge cache was received. If so, the system may transmit the user request to obtain updated information.

At block 410, the system receives a response and updates the edge cache. The response to the user request may be received from the shore-based system. Since this response reflects a most current version of information, the edge cache may be updated.

Figure 5:
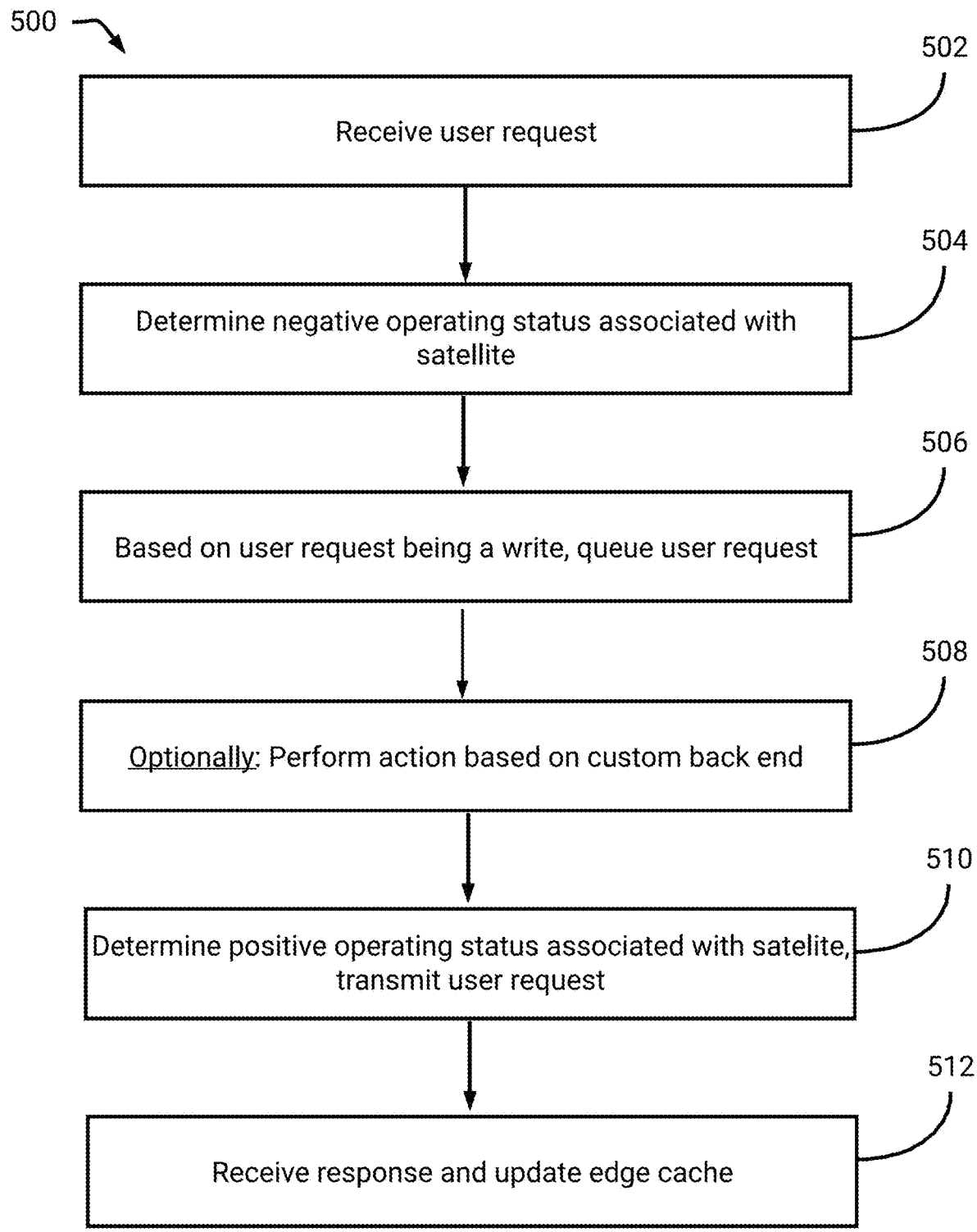
FIG. 5 is a flowchart of an example process for responding to a user write request from an application.

FIG. 5 is a flowchart of an example process 500 for responding to a user write request. For convenience, the process 500 will be described as being performed by a system of one or more computers (e.g., the ship coordination system 100) included in a cruise ship.

At block 502, the system receives a user request from a user device which reflects a write. At block 504, the system determines a negative operating status associated with a satellite system and block 506, queues the user request.

At block 508, the system optionally performs one or more actions based on a custom back end. As described in FIGS. 3B-3C, the system may present a custom message or error message on the user device. For example, the user device may be updated to reflect the custom message. In this example, the custom message may be provided to the user device (e.g., the user device may be pushed the information) or the user device may retrieve the custom message (e.g., the user device may pull the information, such as by polling the system). The custom back end may depend on a type associated with the user request. For example, the type may be based on an endpoint or web application used to service the user request. Additionally, the custom back end may cause the user request to be routed to a device or system in the cruise ship. In this way, an employee on the cruise ship may respond to the user request.

At block 510, the system determines a positive operating status associated with the satellite and transmits the user request. The user request may be transmitted to a shore-based system for routing to a web application configured to respond to the user request. For example, the web application may store application information which the user request may adjust or otherwise modify.

At block 512, the system receives a response and updates an edge cache. The response may be routed to the user device, such that he user device presents information associated with the response. The edge cache, which is described above in FIGS. 2A-2B, may then be updated based on the response.

Figure 6:
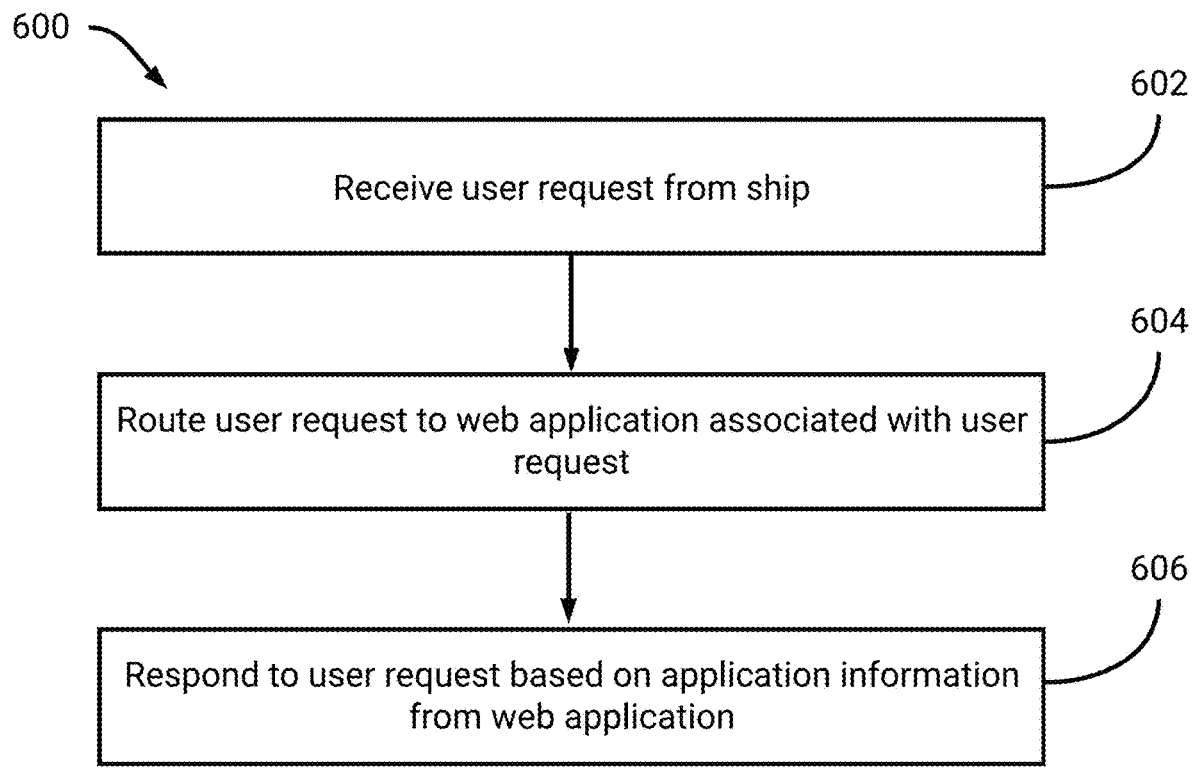
FIG. 6 is a flowchart of an example process for a shore-based system to respond to a user request.

FIG. 6 is a flowchart of an example process 600 for a shore-based system to respond to a user request. For convenience, the process 600 will be described as being performed by a system of one or more computers (e.g., the shore coordination system 120).

At block 602, the system receives a user request from a cruise ship. For example, and as described in FIG. 1, the system may be in communication with a ship-based system (e.g., the ship coordination system 100). The system may be in communication with a multitude of web applications which perform disparate functionality usable by, at least, passengers of the cruise ship.

At block 604, the system routes the user request to a particular web application. The user request may be, as an example, directed to a particular endpoint which is serviceable by the particular web application.

At block 606, the system responds to the user request based on application information from the web application. The web application may provide a response to the user request, for example based on stored application information. With respect to the user request being a write, the web application may modify a portion of the application information. The web application may then provide a response based on the modification. With respect to the user request being a read, the web application may respond with a portion of the application information.

User Request Via Terrestrial Communication Network

As described above, a ship-based system may use a satellite connection to allow for use of modern web applications which execute on a shore-based system (e.g., a cloud system). In addition to simplifying the existing technical environment on cruise ships, use of the techniques described herein address existing user experience deficiencies on cruise ships.

For example, a cruise ship which relies upon an onboard central server system can only communicate with user devices when connected via local Wi-Fi. Thus, when a passenger is located away from the cruise ship (e.g., on an excursion) the passenger's user device will lack a connection to the local Wi-Fi. The user device will therefore be unable to communicate with the central server system. In this way, the passenger will be unable to use his/her user device to reserve a table at an on-board restaurant, reserve tickets for a show, and so on.

This inability to use the functionality of an application on the passenger's user device may reduce a user experience of the passenger. In contrast, the techniques described herein allow for use of the application while the passenger is away from the cruise ship.

Figure 7:
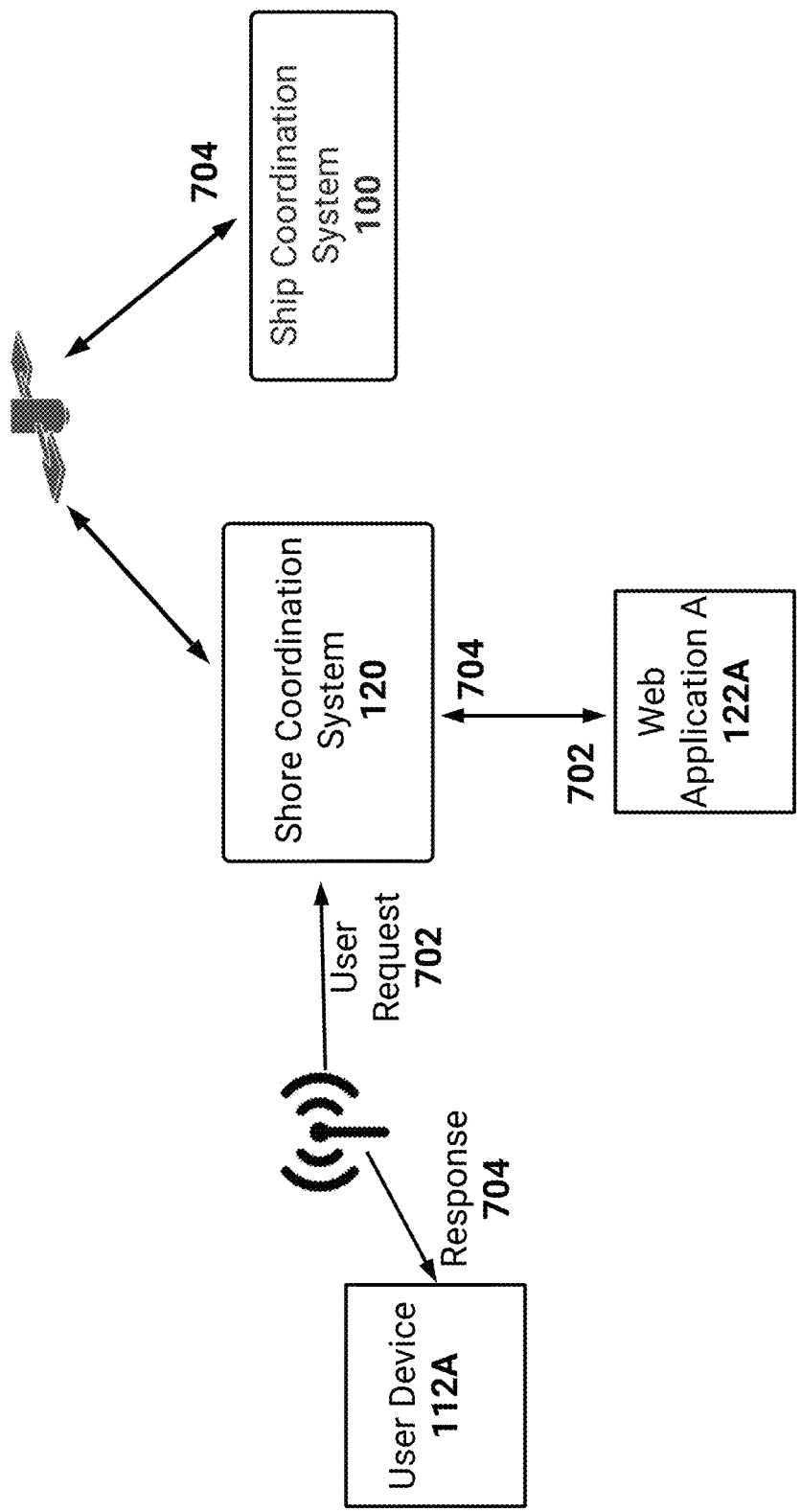
FIG. 7 is a block diagram of a ship coordination system receiving a user request routed via a shore coordination system.

FIG. 7 is a block diagram of a ship coordination system 100 receiving a user request 702 routed via a shore coordination system 120. In the block diagram, a passenger is located away from a cruise ship (e.g., on shore) and using his/her user device 112A. As described herein, the user device 112A may execute an application (e.g., a mobile application) to provide disparate functionality to the passenger. Advantageously, and as will be described, the passenger may use the application while off the cruise ship.

The user device 112A has provided a user request via a terrestrial connection. An example connection may include a connection to a cellular network, a Wi-Fi network (e.g., at a coffee shop, and so on. The user request 702 is being routed to the shore coordination system 120. As described above, the shore coordination system 120 routes the user request 702 to a web application 122A associated with the request 702. The response 704 from the web application 122A is then provided to the shore coordination system 120 for transmission back to the user device 112A.

In addition to transmitting the response 704 to the user device 112A, the response 704 may be provided via the satellite system 130 to the ship coordination system 100. In this way, the ship coordination system 100 may update the above-described edge cache based on the response.

Figure 8:
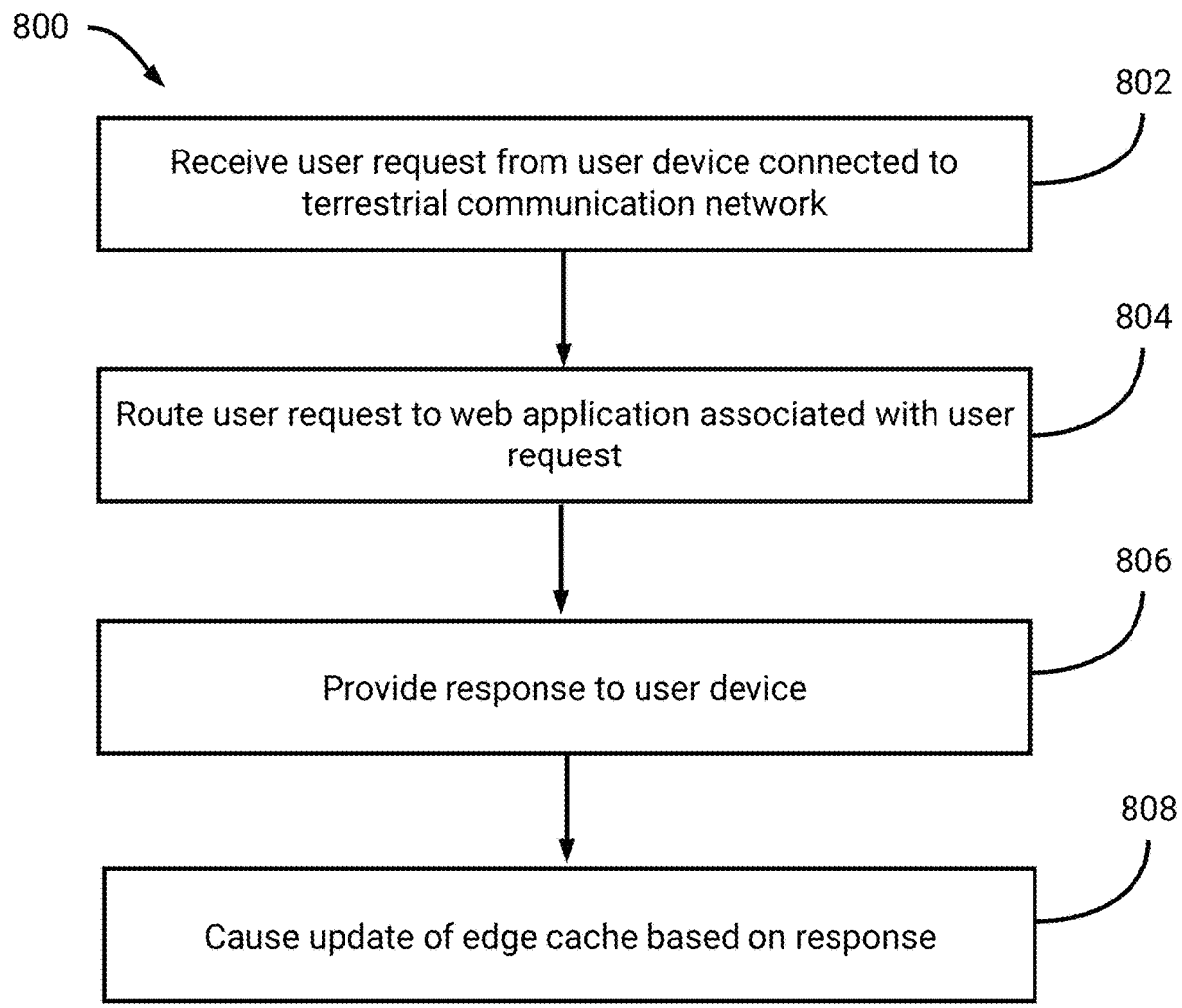
FIG. 8 is a flowchart of an example process to update an edge cache based on a user request provided via a terrestrial communication network.

FIG. 8 is a flowchart of an example process 800 to update an edge cache based on a user request provided via a terrestrial communication network. For convenience, the process 800 will be described as being performed by a system of one or more computers (e.g., the shore coordination system 100).

At block 802, the system receives a user request from a user device connected to a terrestrial communication network. At block 804, the system routes the user request to a web application associated with the request. At block 806, the system provides a response to the user device.

At block 808, the system causes updating of an edge cache on a ship-based system. As described above, with respect to FIGS. 4-5, the edge cache may be updated based on responses received in response to user requests. The system may transmit the response to the ship-based system via a satellite connection as described herein.

Additional Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system for managing user requests associated with a cruise ship, the system comprising:
  a shore-based system comprising one or more computer systems which are configured to:
  access application information associated with a plurality of web applications, the web applications being associated with operation of the cruise ship, and the web applications being configured to respond to user requests from mobile applications which output user interfaces associated with the web applications, and
  route user requests to the web applications, the user requests being received from a ship-based system located on the cruise ship, and the user requests causing updating of the application information,
  wherein responses associated with the user requests are routed to the ship-based system and are usable to update an edge-cache maintained via the ship-based system, the responses comprising at least a portion of the application information; and
  the ship-based system, the ship-based system being located on the cruise ship and in wireless communication with a plurality of user devices of passengers, and the ship-based system comprising:
  a satellite communication system, wherein the satellite communication system is configured to route information via a satellite network between, at least, the ship-based system and the shore-based system, and wherein the satellite network is associated with constrained bandwidth,
  the edge-cache comprising one or more data stores, wherein the data stores are configured to store the portion of the application information associated responses to user requests, and wherein the edge-cache is usable to update the mobile applications being executed by the user devices based on the portion of the application information, and
  one or computer systems configured to:
  receive a plurality of user requests from the user devices, wherein the user requests are associated with the mobile applications, and
  determine an operating status associated with the satellite communication system, the operation status being indicative of the satellite communication system having bandwidth and/or connectivity to route the user requests via the satellite network, wherein based on the operating status being negative:
queue a first subset of the user requests, wherein the first subset are transmitted according to the queue based on the operating status being positive,
respond, based on information stored in the edge cache, to a second subset of the user requests, wherein responding causes updating of one or more user devices associated with the second subset, and wherein based on the operating status being positive, transmit the user requests via the satellite network to the shore-based system.

2. The system of claim 1, wherein the portion of the application information is associated with different time-to-live (TTL) information, wherein each TTL information indicates a threshold amount of time until information is configured to be discarded from the edge-cache or refreshed based on the operating status being positive.

3. The system of claim 2, wherein the edge-cache is updated according to the TTL information, such that subsets of the portion are updated at different frequencies.

4. The system of claim 1, wherein based on the operating status being negative, the one or more computer systems included in the ship-based system are further configured to:
analyze request information included in a particular user request from a particular user device, the particular user request being associated with a particular mobile application,
generate, based on the request information, information for transmission to one or more devices included in the cruise ship, and
cause updating of the particular mobile application executing on the particular user device.

5. The system of claim 4, wherein the particular mobile application is associated with reserving a service, and wherein the one or more devices are usable by an employee of the cruise ship associated with the service.

6. The system of claim 4, wherein the particular mobile application is associated with reserving a service, and wherein the particular mobile application is updated to reflect confirmation of the reservation.

7. The system of claim 1, wherein based on the operating status being negative, the one or more computer systems included in the ship-based system are further configured to:
respond to a particular user request, which is included in the second subset, from a particular user device with a static response, the static response causing updating of the particular mobile application executing on the particular user device, or
cause updating of the particular mobile application to present a custom error based on the particular user request, or
redirect the particular user request to one or more computers included in the cruise ship, the computer systems being selected based on the particular user request, wherein the particular user request is subsequently transmitted to the shore-based system based on the operating status being positive.

8. The system of claim 1, wherein when a particular mobile device loses wireless communication with the ship-based system and is in wireless communication with a terrestrial cellular network, the one or more computer systems included in the shore-based system are further configured to:
receive a particular user request from the particular mobile device, the particular user request being provided via the cellular network for transmission to the shore-based system;
route the particular user request to a particular web application associated with the particular user request, such that application information associated with the particular web application is updated; and
cause updating of the particular mobile device.

9. The system of claim 8, wherein to cause updating of the particular mobile device, the one or more computer systems are configured to
route response information from the particular web application to the particular mobile device.

10. The system of claim 8, wherein the one or more computer systems are configured to:
cause updating of the edge cache, wherein the updated edge cache reflects the updated application information associated with the particular web application.

11. A method implemented by a system of one or more computers, the system being located on a cruise ship and usable to manage user requests associated with the cruise ship, the method comprising:
receiving a plurality of user requests from user devices in wireless communication with the system, wherein the user requests are associated with applications executing on the user devices, and
determining an operating status associated with a satellite communication system located on the cruise ship, the operation status being indicative of the satellite communication system having bandwidth and/or connectivity to route the user requests via a satellite network,
wherein based on the operating status being negative:
queuing a first subset of the user requests, wherein the first subset are transmitted according to the queue based on the operating status being positive, and
responding, based on information stored in an edge cache maintained by the system, to a second subset of the user requests, wherein responding causes updating of one or more user devices associated with the second subset,
and wherein based on the operating status being positive, transmitting the user requests via the satellite network to a shore-based system, the shore-based system routing the user requests to web applications associated with different functionality.

12. The method of claim 11, wherein a response to a particular user request of the first subset is received, and wherein the edge cache is updated based on the response.

13. The method of claim 11, wherein information stored in the edge-cache is associated with to time-to-live (TTL) information, wherein each TTL information indicates a threshold amount of time until information is configured to be discarded from the edge cache or refreshed based on the operating status being positive, and wherein the system is configured to update the edge cache to ensure the information does not exceed associated threshold amounts of time.

14. The method of claim 11, wherein based on the operating status being negative, the method further comprises:
analyzing request information included in a particular user request from a particular user device, the particular user request being associated with a particular application,
generating, based on the request information, information for transmission to one or more devices included in the cruise ship, and causing an update of the particular application executing on the particular user device or providing updated information for the particular application to retrieve.

15. The method of claim 14, wherein the particular application is associated with reserving a service, and wherein the one or more devices are usable by an employee of the cruise ship associated with the service.

16. The method of claim 14, wherein the particular application is associated with reserving a service, and wherein the particular application is updated to reflect confirmation of the reservation.

17. The method of claim 11, wherein based on the operating status being negative, the method further comprises:
   responding to a particular user request, which is included in the second subset, from a particular user device with a static response, the static response causing updating of a particular application executing on the particular user device, or
   causing updating of the particular application to present a custom error based on the particular user request, or
   redirecting the particular user request to one or more devices included in the cruise ship, the devices being selected based on the particular user request.

18. Non-transitory computer storage media storing instructions configured for execution by a system of one or more computers, the system being located on a cruise ship and usable to manage user requests associated with the cruise ship, wherein the instructions cause the system to perform operations comprising:
   receiving a plurality of user requests from user devices in wireless communication with the system, wherein the user requests are associated with applications executing on the user devices, and
   determining an operating status associated with a satellite communication system located on the cruise ship, the operation status being indicative of the satellite communication system having bandwidth and/or connectivity to route the user requests via a satellite network, wherein based on the operating status being negative:
   queuing a first subset of the user requests, wherein the first subset are transmitted according to the queue based on the operating status being positive, and
   responding, based on information stored in an edge cache maintained by the system, to a second subset of the user requests, wherein responding causes updating of one or more user devices associated with the second subset,
   and wherein based on the operating status being positive, transmitting the user requests via the satellite network to a shore-based system, the shore-based system routing the user requests to web applications associated with different functionality.

19. The non-transitory computer storage media of claim 18, wherein based on the operating status being negative, the operations further comprise:
   analyzing request information included in a particular user request from a particular user device, the particular user request being associated with a particular application,
   generating, based on the request information, information for transmission to one or more devices included in the cruise ship, and
   causing an update of the particular application executing on the particular user device.

20. The non-transitory computer storage media of claim 18, wherein based on the operating status being negative, the operations further comprise:
   responding to a particular user request, which is included in the second subset, from a particular user device with a static response, the static response causing updating of the particular application executing on the particular user device, or
   causing updating of the particular application to present a custom error based on the particular user request, or
   redirecting the particular user request to one or more devices included in the cruise ship, the devices being selected based on the particular user request.

* * * * *